United States Patent
Tsang et al.

(10) Patent No.: US 11,482,762 B2
(45) Date of Patent: Oct. 25, 2022

(54) BATTERY

(71) Applicant: GP BATTERIES INTERNATIONAL LIMITED, Hong Kong (HK)

(72) Inventors: Hing Po Tsang, Hong Kong (HK); Ping Hung Tang, Hong Kong (HK); Yuen Han Luk, Hong Kong (HK)

(73) Assignee: GP Batteries International Limited, Hong Kong (HK)

( * ) Notice: Subject to any disclaimer, the term of this patent is extended or adjusted under 35 U.S.C. 154(b) by 77 days.

(21) Appl. No.: 17/264,317

(22) PCT Filed: Jul. 30, 2019

(86) PCT No.: PCT/CN2019/098278
§ 371 (c)(1),
(2) Date: Jan. 29, 2021

(87) PCT Pub. No.: WO2020/024918
PCT Pub. Date: Feb. 6, 2020

(65) Prior Publication Data
US 2021/0296742 A1    Sep. 23, 2021

(30) Foreign Application Priority Data
Jul. 30, 2018 (GB) ..................... 1812381

(51) Int. Cl.
*H01M 50/538* (2021.01)
*H01M 50/186* (2021.01)
(Continued)

(52) U.S. Cl.
CPC ..... *H01M 50/538* (2021.01); *H01M 10/0422* (2013.01); *H01M 10/0431* (2013.01);
(Continued)

(58) Field of Classification Search
CPC ............. H01M 50/538; H01M 50/186; H01M 50/528; H01M 50/836; H01M 50/609;
(Continued)

(56) References Cited

U.S. PATENT DOCUMENTS

| | | |
|---|---|---|
| 3,761,314 A | 9/1973 | Cailley |
| 4,051,304 A | 9/1977 | Snook |

(Continued)

FOREIGN PATENT DOCUMENTS

| | | |
|---|---|---|
| CA | 2305412 A1 | 4/1999 |
| CN | 201156553 Y | 11/2008 |

(Continued)

OTHER PUBLICATIONS

Celina Mikolajczak et al., "Lithium-Ion Batteries Hazard and Use Assessment",The Fire Protection Research Foundation, Jul. 2011.
(Continued)

*Primary Examiner* — Matthew T Martin
*Assistant Examiner* — Adam J Francis
(74) *Attorney, Agent, or Firm* — Idea Intellectual Limited; Margaret A. Burke; Sam T. Yip

(57) ABSTRACT

A battery (30) is disclosed which comprises: a housing (32) containing an electrolyte solution; a plurality of jelly roll electrode assemblies (10) arranged substantially in parallel with each other in contact with the electrolyte solution within the housing (32) thereby forming a single electrochemical system of the battery (30), each jelly roll electrode assembly (10) having a first end (10A) and an opposing second end (10B); and a current collector plate (20); wherein the current collector plate (20) is arranged to be shared among and in direct physical and electrical contact with the first ends (10A) of the plurality of jelly roll electrode assemblies (10).

12 Claims, 11 Drawing Sheets

(51) Int. Cl.
*H01M 50/528* (2021.01)
*H01M 50/536* (2021.01)
*H01M 10/04* (2006.01)
*H01M 10/28* (2006.01)
*H01M 10/30* (2006.01)

(52) U.S. Cl.
CPC ......... *H01M 10/286* (2013.01); *H01M 10/30* (2013.01); *H01M 50/186* (2021.01); *H01M 50/528* (2021.01); *H01M 50/536* (2021.01)

(58) Field of Classification Search
CPC ............. H01M 50/107; H01M 50/152; H01M 50/184; H01M 50/477; H01M 50/48; H01M 50/559; H01M 50/502; H01M 10/0422; H01M 10/286; H01M 10/30; H01M 10/0431; H01M 10/04; H01M 10/28; H01M 10/045
See application file for complete search history.

(56) References Cited

U.S. PATENT DOCUMENTS

| | | | |
|---|---|---|---|
| 4,929,519 | A | 5/1990 | Catotti |
| 6,040,085 | A | 3/2000 | Cheu et al. |
| 6,190,794 | B1 | 2/2001 | Wyser |
| 6,287,719 | B1 | 9/2001 | Bailey |
| 8,546,007 | B2 | 10/2013 | Lee et al. |
| 8,815,437 | B2 | 8/2014 | Lee |
| 9,331,358 | B2 | 5/2016 | Bhardwaj et al. |
| 2001/0041288 | A1 | 11/2001 | Onishi et al. |
| 2005/0008933 | A1 | 1/2005 | Ligeois et al. |
| 2006/0024572 | A1 | 2/2006 | Lee |
| 2006/0040176 | A1 | 2/2006 | Ling et al. |
| 2006/0051664 | A1 | 3/2006 | Tasai et al. |
| 2011/0104540 | A1* | 5/2011 | Lee .................. H01M 10/617 429/94 |
| 2012/0045670 | A1 | 2/2012 | Stefan et al. |
| 2014/0030567 | A1 | 1/2014 | McKinney et al. |
| 2014/0113185 | A1* | 4/2014 | Mori .................. H01M 50/171 29/25.03 |
| 2015/0111090 | A1 | 4/2015 | Lee et al. |
| 2017/0098815 | A1 | 4/2017 | Kim et al. |
| 2018/0190962 | A1 | 7/2018 | Masson |
| 2018/0287127 | A1* | 10/2018 | Onnerud .................. B60L 50/64 |

FOREIGN PATENT DOCUMENTS

| | | |
|---|---|---|
| CN | 201663201 U | 12/2010 |
| CN | 108011134 A | 5/2018 |
| EP | 0955682 A1 | 11/1999 |
| EP | 1983595 A1 | 10/2008 |
| EP | 2793293 A1 | 10/2014 |
| EP | 2636085 B1 | 9/2018 |
| EP | 2907177 B1 | 7/2019 |
| JP | 2000260417 A | 9/2000 |
| JP | 2000323117 A | 11/2000 |
| JP | 4496582 B2 | 7/2010 |
| JP | 4826686 B2 | 11/2011 |
| JP | 2012104341 A | 5/2012 |
| JP | 2013105586 A | 5/2013 |
| JP | 5506103 B2 | 3/2014 |
| JP | 2016004633 A | 1/2016 |
| KR | 20110127972 A | 11/2011 |
| KR | 20140059737 A | 5/2014 |
| KR | 20140147660 A | 12/2014 |
| WO | 1995031836 A1 | 11/1995 |

OTHER PUBLICATIONS

Madhav Singha et al., "Thick Electrodes for High Energy Lithium Ion Batteries", Journal of The Electrochemical Society, Mar. 2015.
Jelle Smekens et al., "Influence of Electrode Density on the Performance of Li-Ion Batteries", Energies, Feb. 12, 2016.
Jim McDowall, "Understanding Lithium-Ion Technology", PE/SB Winter Meeting 2015, New Orleans.
4 Search Reports of corresponding GB patent application No. GB1812381.0 dated Dec. 21, 2018, Apr. 23, 2019, Apr. 25, 2019 and Apr. 26, 2019.
Extended European Search Report of the corresponding EP application No. 19844394.7 dated Mar. 31, 2022.

* cited by examiner

BATTERY

CROSS-REFERENCE TO RELATED APPLICATION

This application is a 371 application of PCT application no. PCT/CN2019/098278 filed Jul. 30, 2019, which claims priority from a U.K. patent application no. 1812381.0 filed Jul. 30, 2018, and the disclosures of which are incorporated herein by reference in their entirety.

TECHNICAL FIELD

The invention relates to a battery, and more particularly, although not exclusively, to a high capacity, rechargeable battery.

BACKGROUND ART

Typically, to form a high capacity, rechargeable battery unit, a number of conventional rechargeable batteries are electrically connected in parallel or series and typically enclosed in a housing to provide a single rechargeable battery pack. However, such battery packs are typically bulky in size due to the need to provide internal electrical connections between the conventional rechargeable batteries within the battery pack housing and to provide the housing with externally accessible electrical terminals or connectors.

Where the conventional rechargeable batteries are electrically connected in parallel within the battery pack, problems can occur with parallel recharging. One problem with recharging batteries in parallel is that a battery's open-circuit potential decreases as its temperature increases. During charging, if a battery in a battery pack warms up first, it would draw more charging current than the other batteries in the pack due to the lowered open-circuit potential. This in turn can cause further warming and a yet lower open-circuit potential, thereby setting up a positive feedback loop. Such a positive feedback loop may result in a large imbalance in the charging current distribution between the batteries in the pack and may lead to overcharging and consequent damage in some of the batteries. This is a particular issue with Nickle-based batteries such as NickleMetal Hydride (NIMH) batteries.

WO2016/185452 discloses a method of forming an assembly of an electrode layer or plate and a current collector plate, the electrode layer having an active region comprising a layer of active material on a substrate layer, wherein the method comprises laser welding the current collector plate to the electrode layer where the active material is on the region to be welded. However, laser welding onto an end of an electrode layer presents many challenges and can lead to damage of the electrode assembly separator layer.

U.S. Pat. Nos. 8,815,437 and 8,546,007 each disclose a high capacity, rechargeable battery including at least one current collecting plate, a plurality of electrode assemblies electrically connected in parallel with each other via the current collecting plate, wherein each of the electrode assemblies comprises two opposing ends, and wherein the current collecting plate is indirectly electrically connected to one of the two ends of each of the electrode assemblies, and a can configured to accommodate the current collecting plate and the plurality of electrode assemblies. The current collecting plate is electrically connected to the plurality of electrode assemblies by lead tabs extending outwardly from the plurality of electrode assemblies. The lead tabs are connected to electrode layers in the electrode assemblies by conventional methods such as resistance welding. Due to the high heat levels of resistance welding, great care must be taken not to damage the separator layers of the electrode assemblies.

In U.S. Pat. Nos. 8,815,437 and 8,546,007, the arrangement is such that the current collecting plate is spaced above the plurality of electrode assemblies by the lead tabs. The position of the current collecting plate with respect to a cap plate of the battery is rigidly fixed by means of a connection member which extends between the current collecting plate and the battery cap plate. A problem with this battery arrangement is that any movement of the plurality of electrode assemblies within the can may fatigue the lead tabs and eventually lead to breakage of one or more of said lead tabs. Furthermore, the leads tabs limit the size and efficiency of conducting pathways from the electrode layers of the electrode assemblies to their respective current collecting plates.

There is therefore a need for an improved high capacity, rechargeable battery.

SUMMARY OF INVENTION

Technical Problem

An object of the invention is to mitigate or obviate to some degree one or more problems associated with known high capacity, rechargeable batteries.

The above object is met by the combination of features of the main claims; the sub claims disclose further advantageous embodiments of the invention.

One skilled in the art will derive from the following description other objects of the invention. Therefore, the foregoing statements of object are not exhaustive and serve merely to illustrate some of the many objects of the present invention.

Solution to Problem

Technical Solution

In a first main aspect, the invention provides a battery comprising a housing containing an electrolyte solution; a plurality of jelly roll electrode assemblies arranged substantially in parallel with each other in contact with the electrolyte solution within the housing thereby forming a single electrochemical system of the battery, each jelly roll electrode assembly having a first end and an opposing second end; and a current collector plate; wherein the current collector plate is arranged to be shared among and in direct physical and electrical contact with the first ends of the plurality of jelly roll electrode assemblies.

In a second main aspect, the invention provides a battery comprising a housing arranged to accommodate an electrolyte solution; a battery terminal; an electrode assembly holder having a peripheral wall conforming to an inside surface of the housing; one or more jelly roll electrode assemblies positioned in the housing by means of the holder, wherein the holder is configured with one or more channels to allow fluid communication of the electrolyte solution among the one or more jelly roll electrode assemblies; and wherein an upper peripheral wall section of the holder is adapted to engage the battery terminal to facilitate a direct physical and electrical contact of the one or more jelly roll electrode assemblies with the battery terminal.

Advantageous Effects of Invention

BRIEF DESCRIPTION OF DRAWINGS

Description of Drawings

Figure 1:
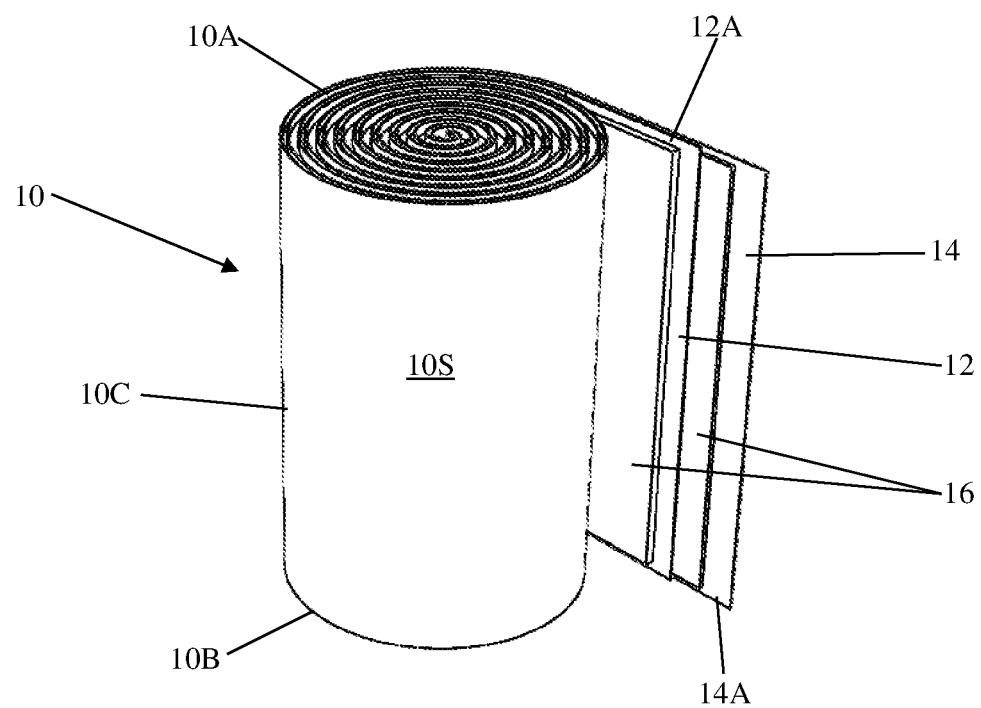
Figure 2:
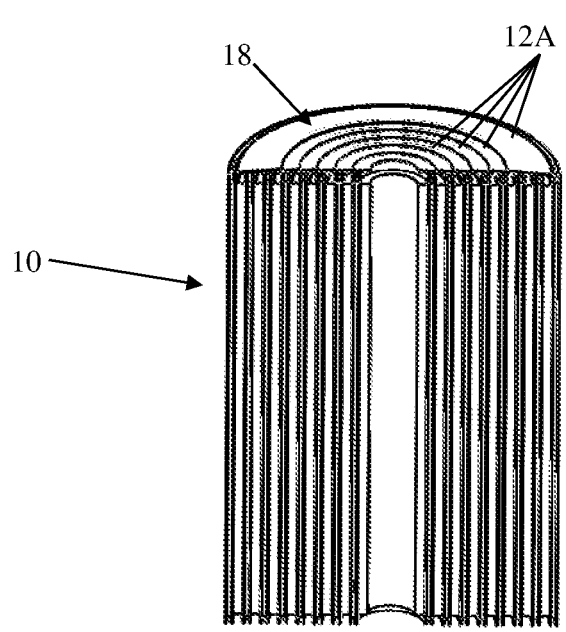
Figure 3:
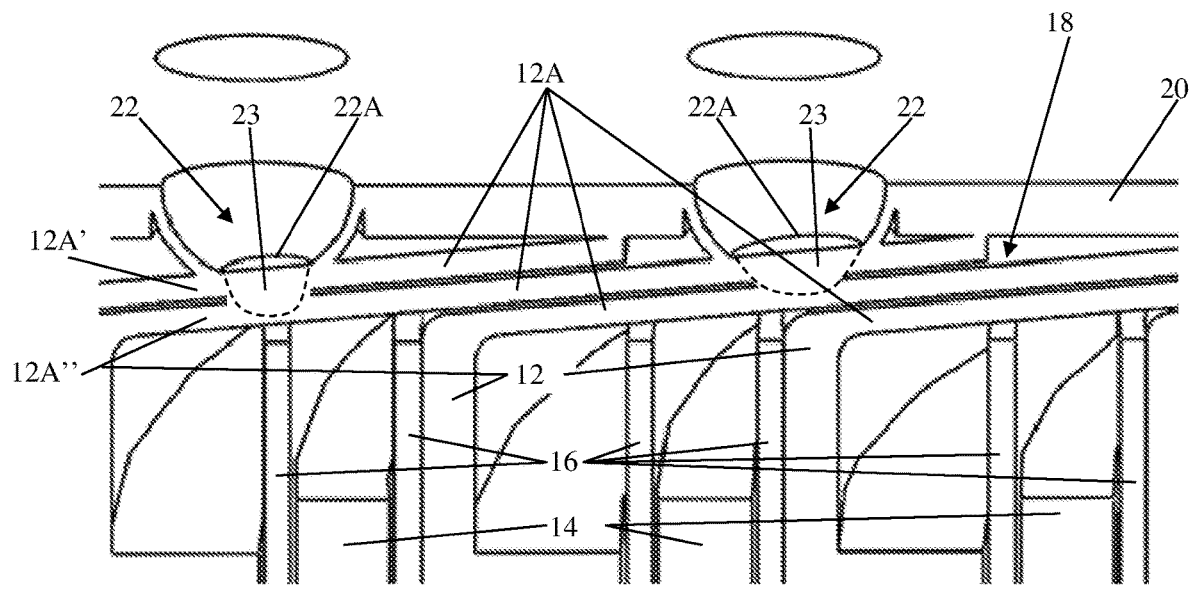
Figure 4:
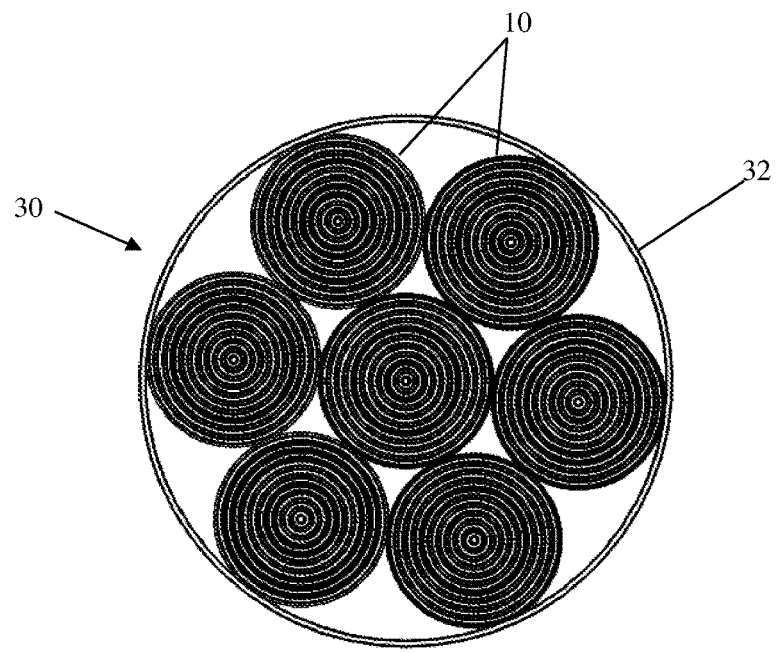
Figure 5:
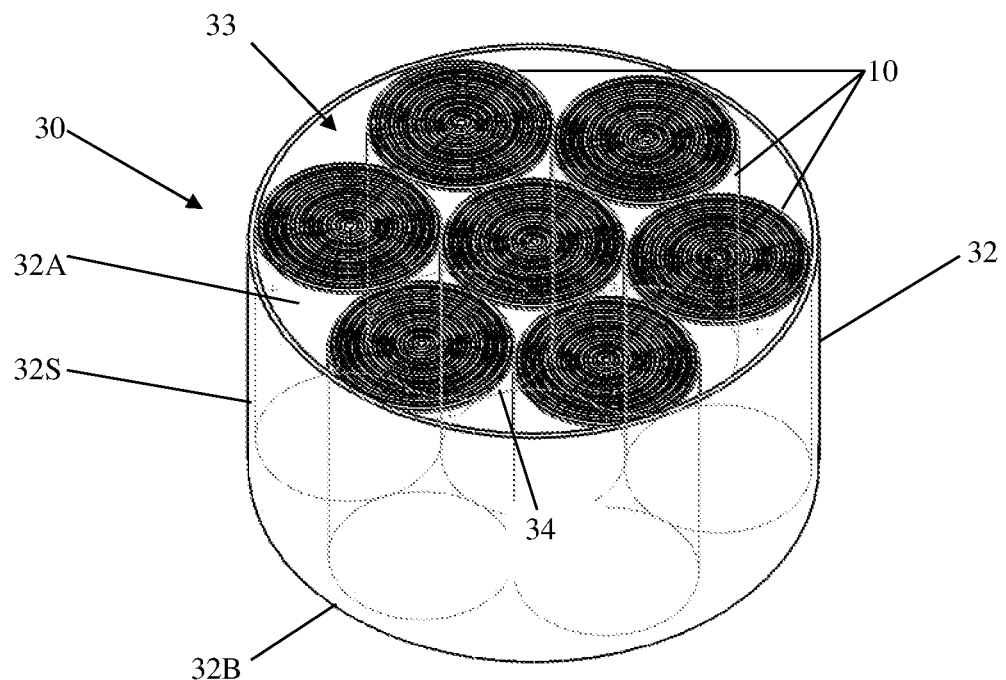
Figure 6:
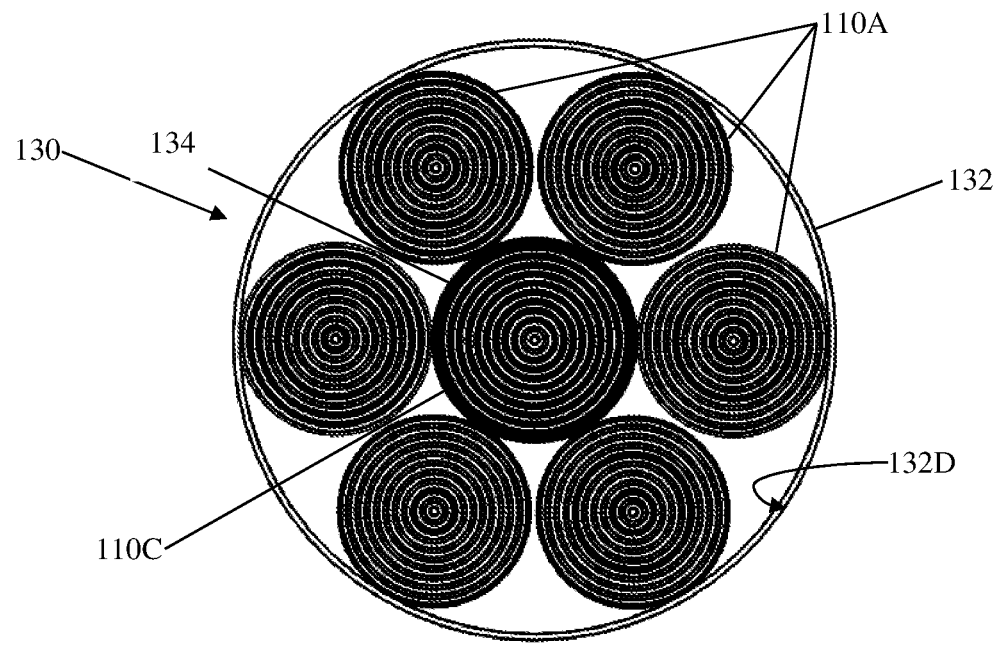
Figure 7:
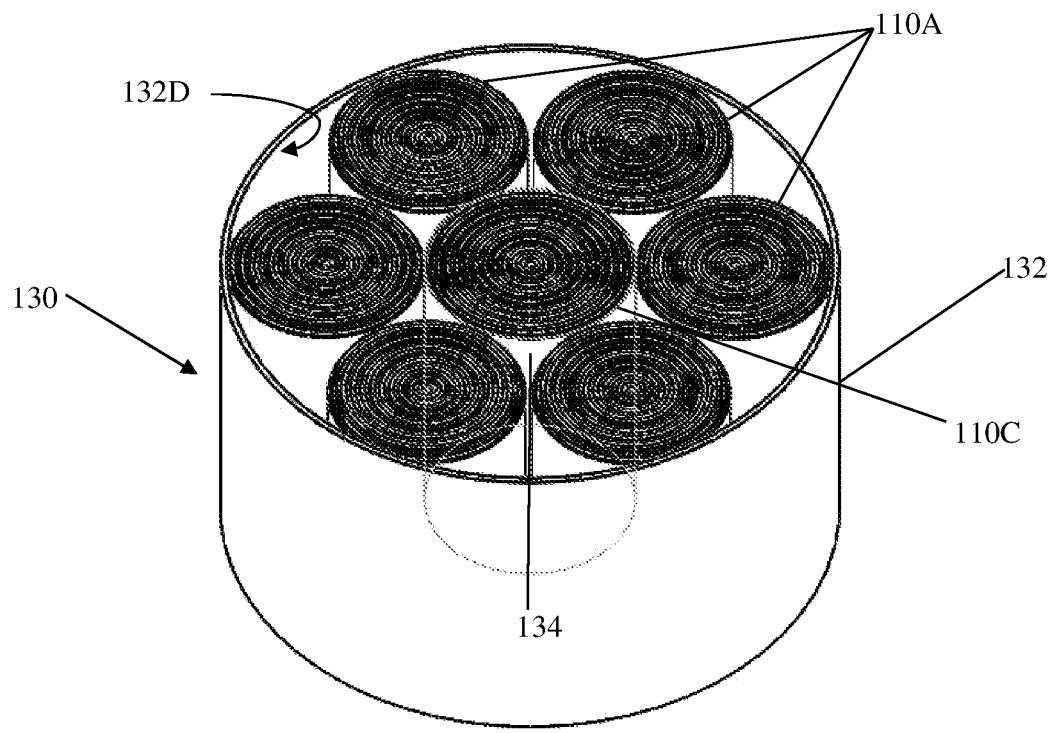
Figure 8:
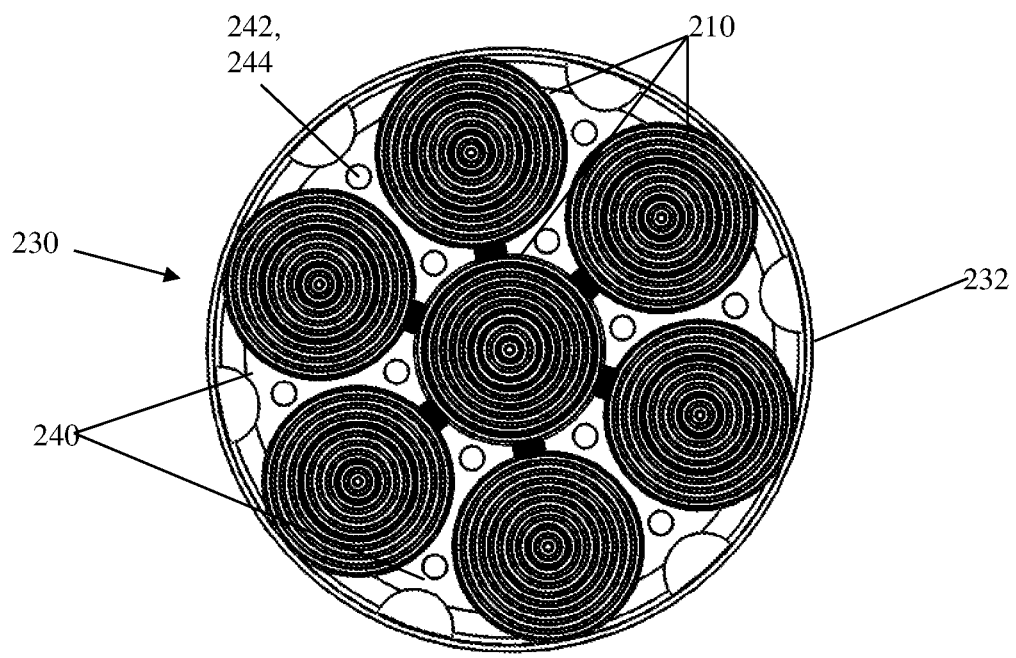
Figure 9:
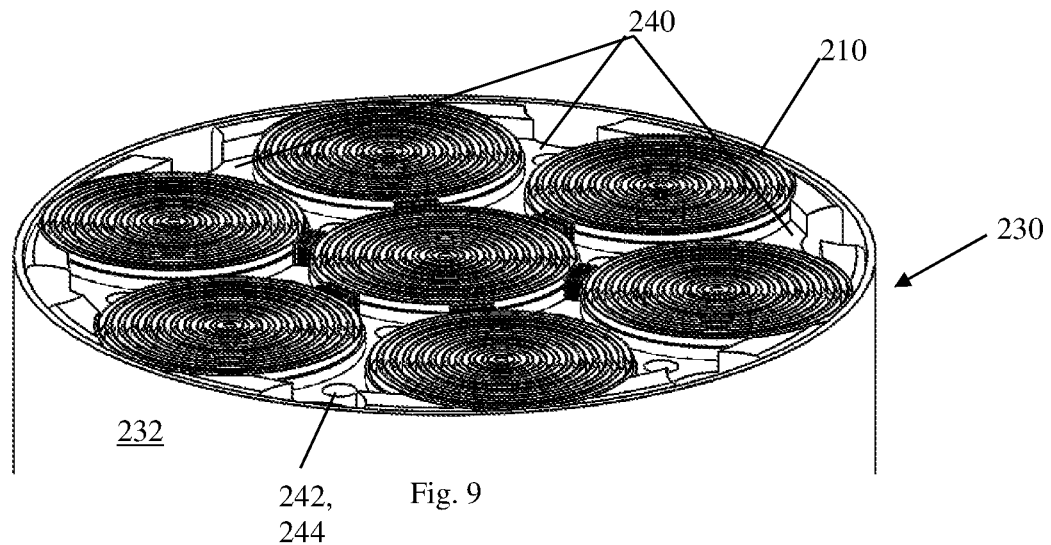
Figure 10:
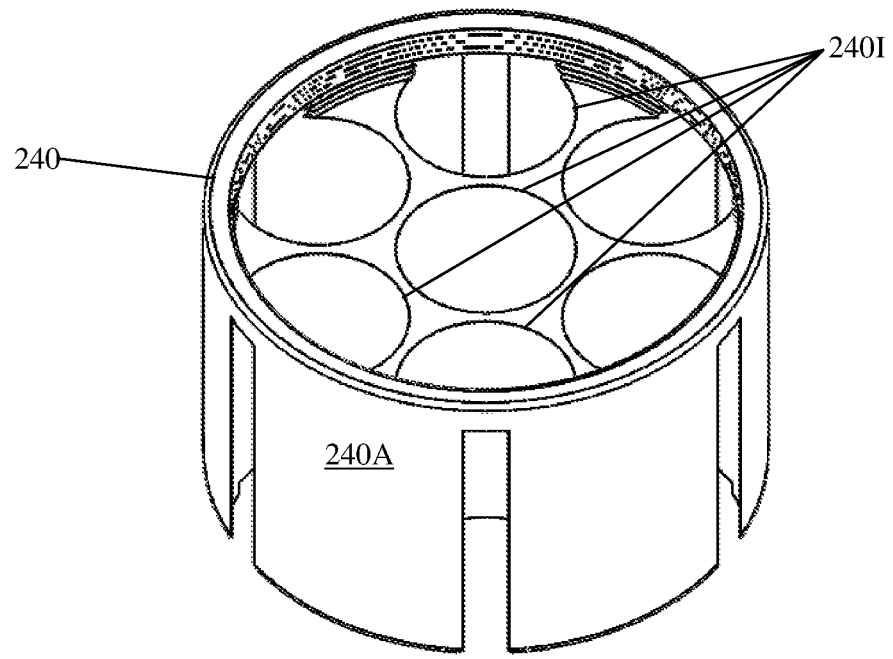
Figure 11:
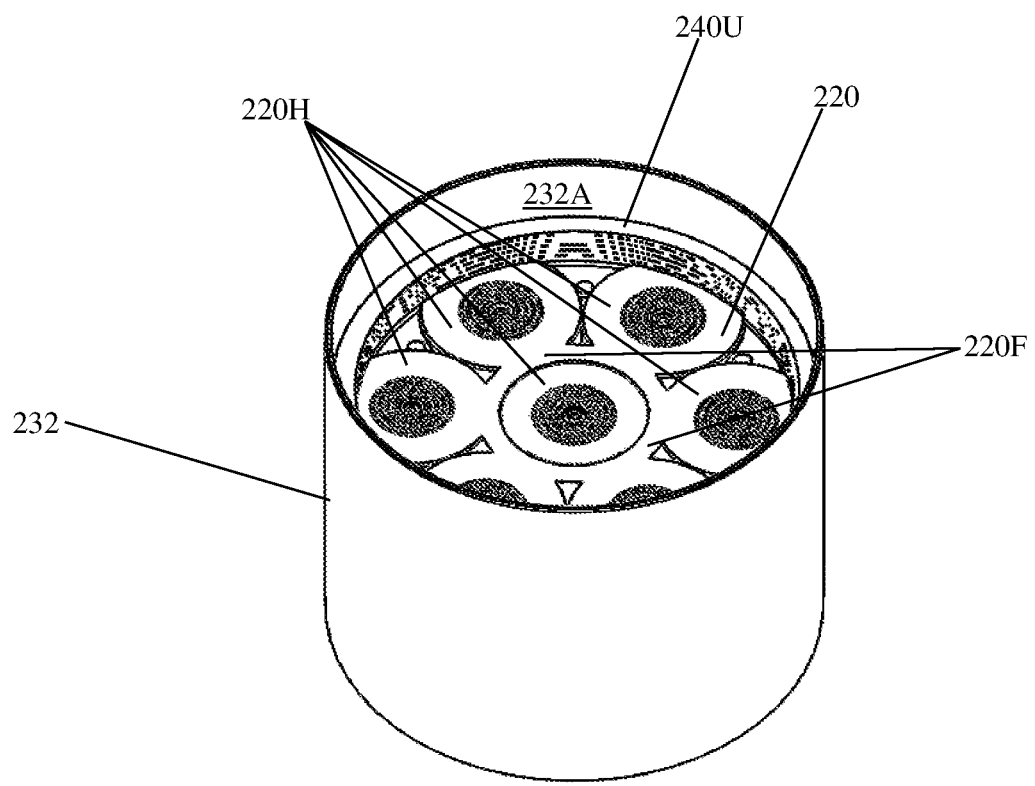
Figure 12:
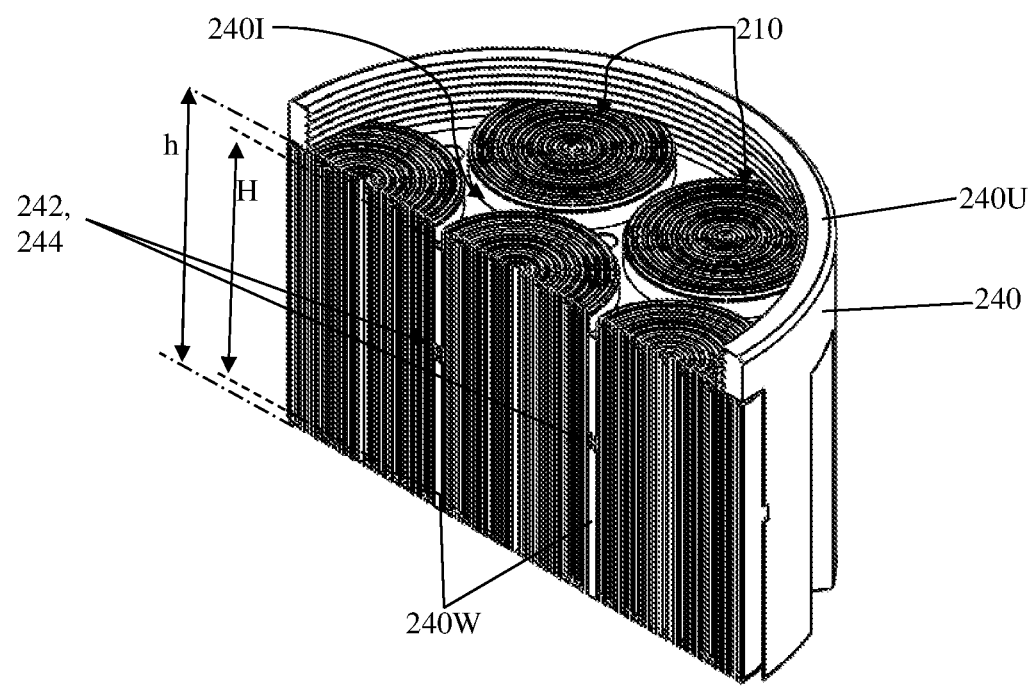
Figure 13:
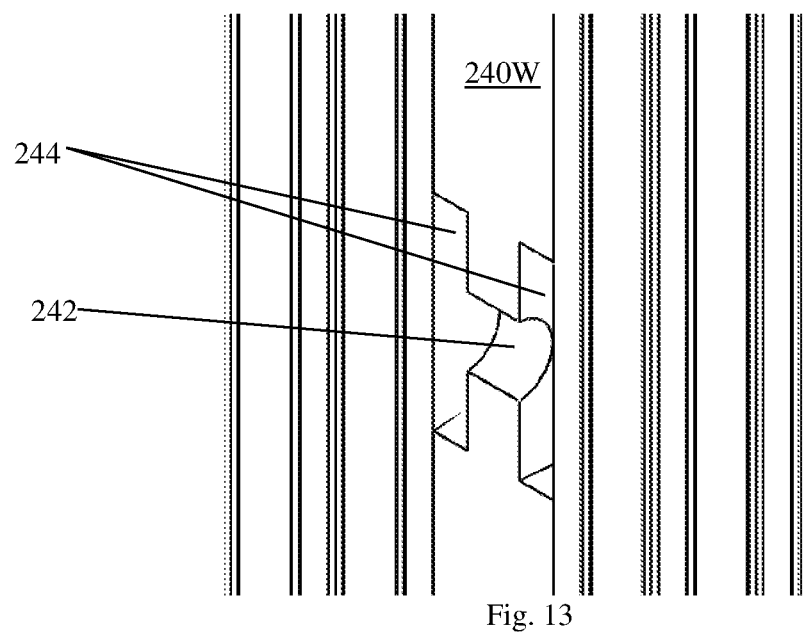
Figure 14:
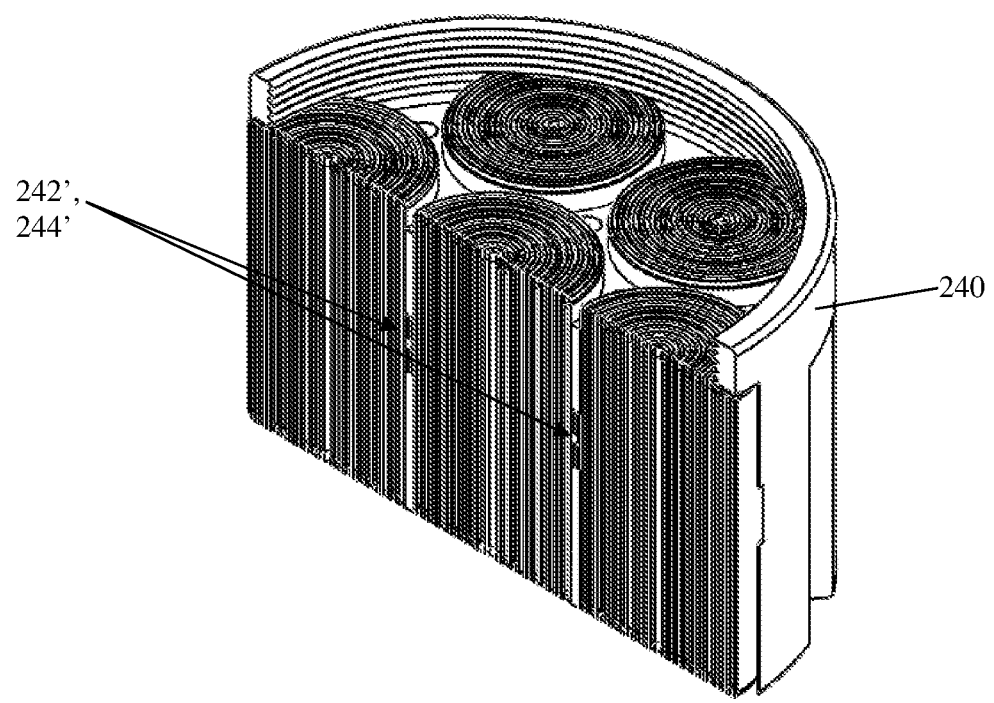
Figure 15:
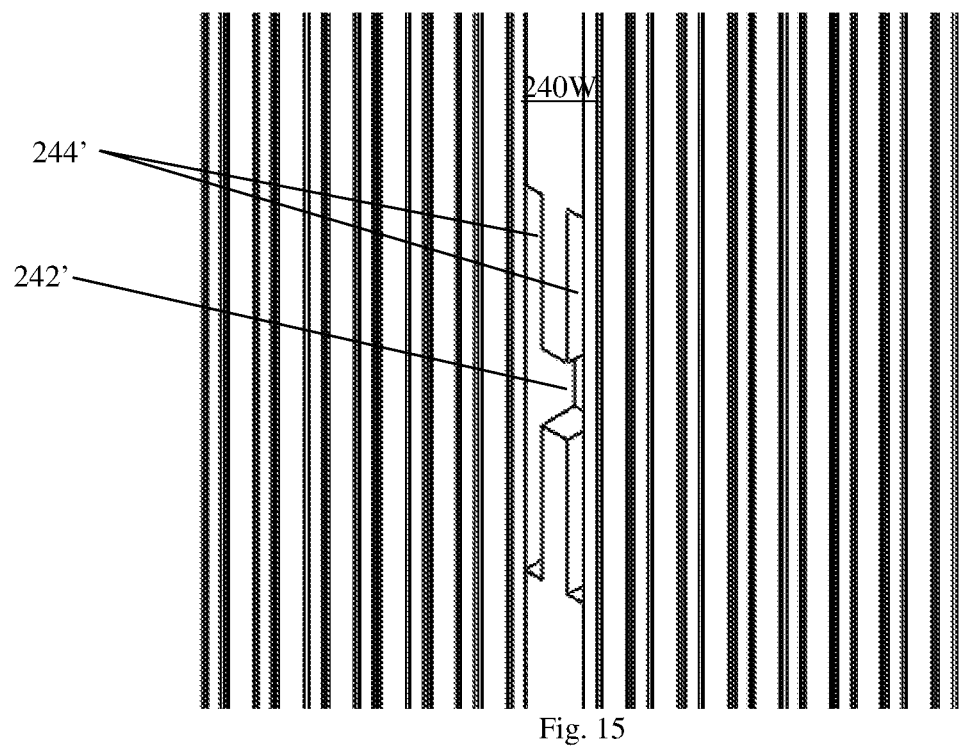
Figure 16A:
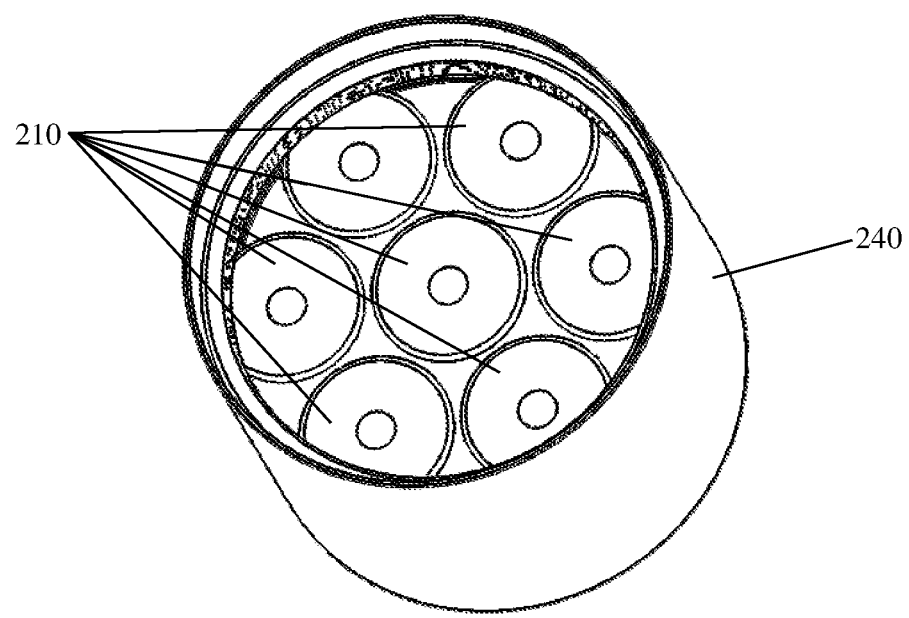
Figure 16B:
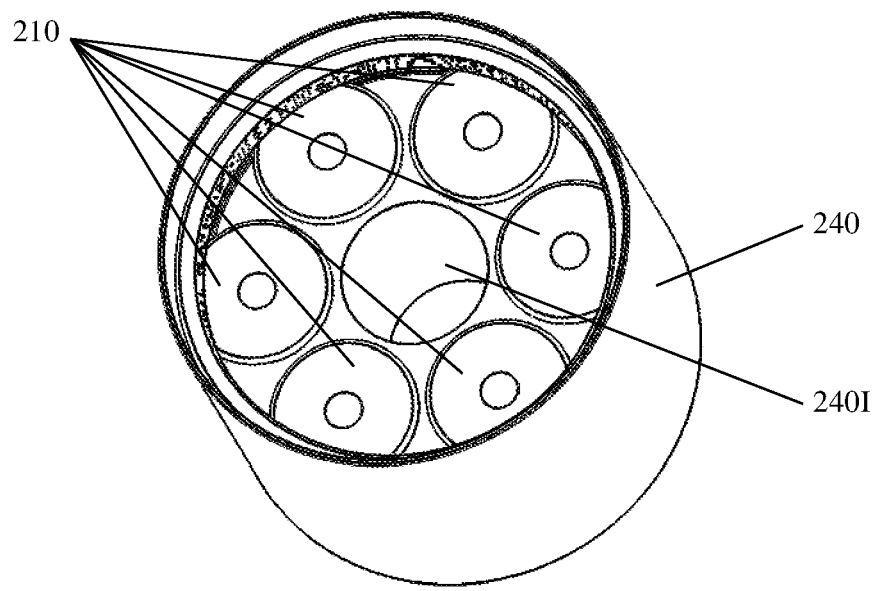
Figure 16C:
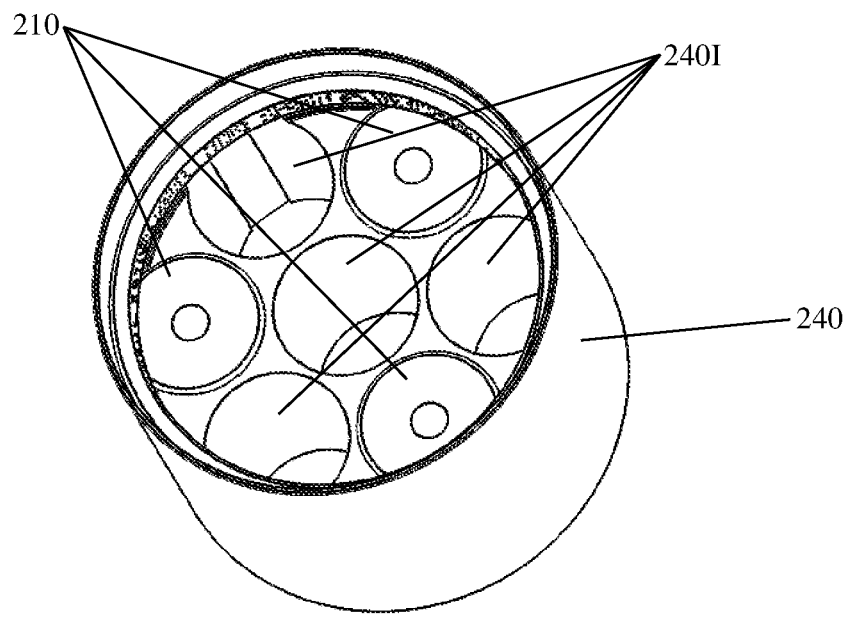
Figure 17:
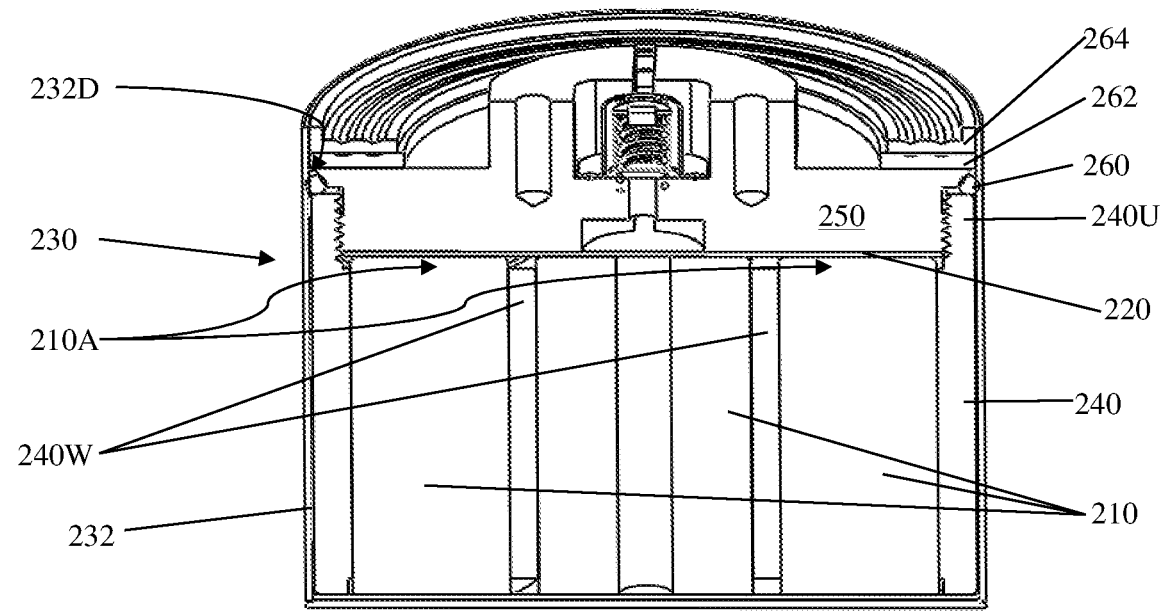
Figure 18:
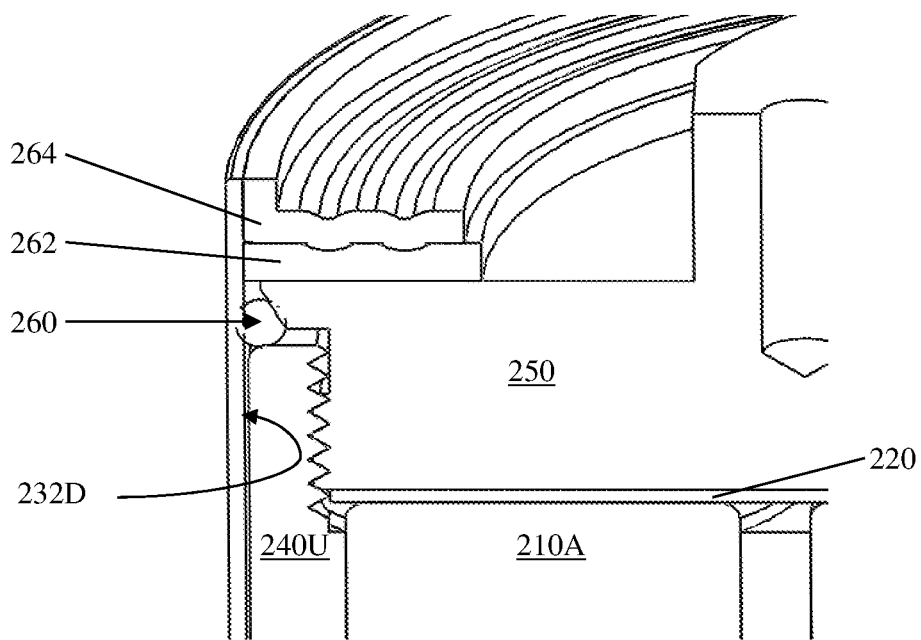
Figure 19:
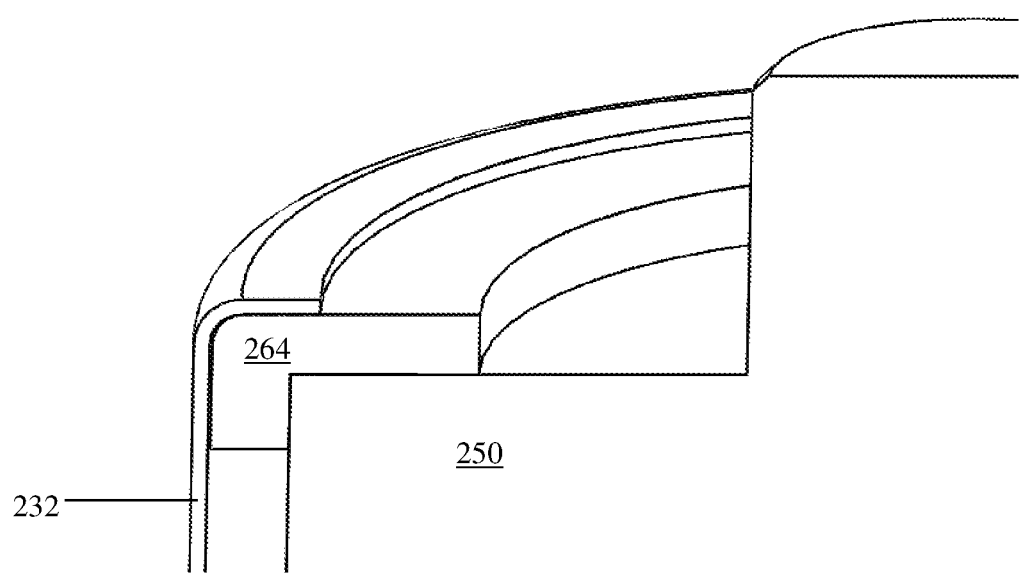
Figure 20:
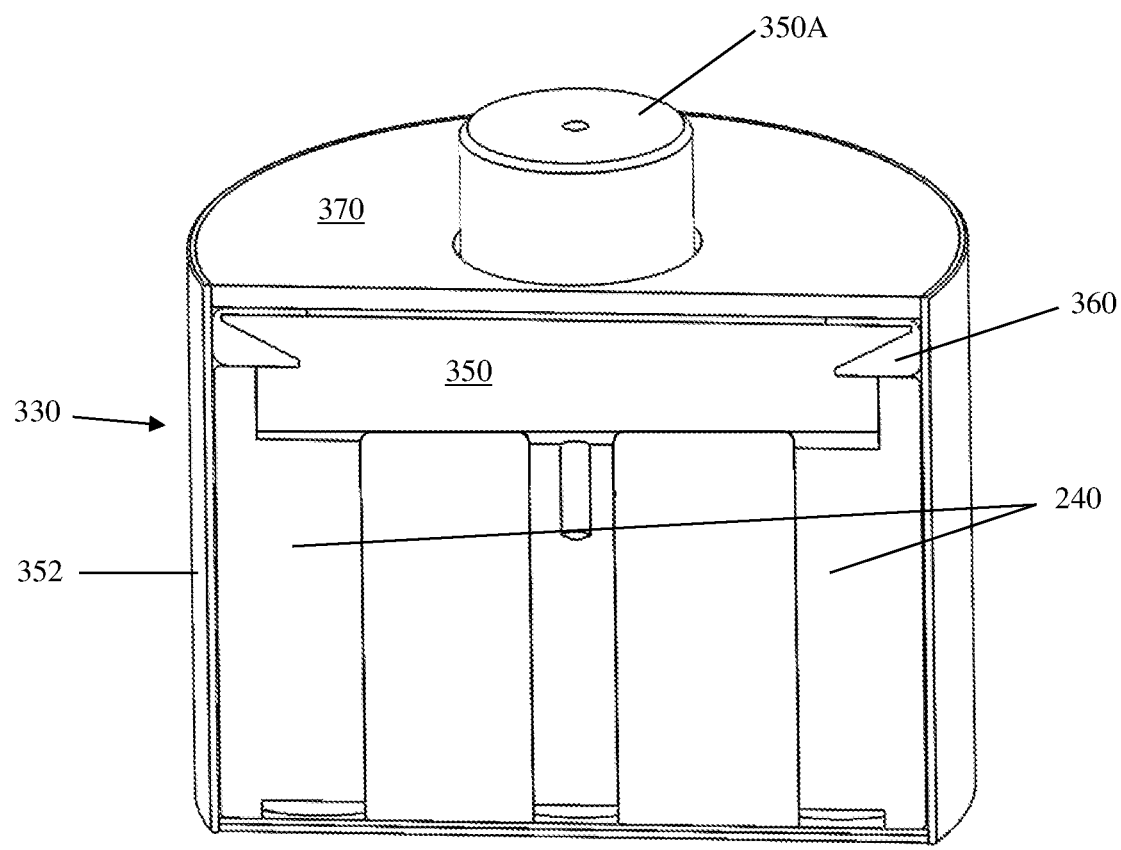

The foregoing and further features of the present invention will be apparent from the following description of preferred embodiments which are provided by way of example only in connection with the accompanying figures, of which:

FIG. 1 is a perspective view of an electrode assembly for a battery in the form of a partially wound jelly roll;

FIG. 2 is a side sectional view of a jelly roll having a continuous layered electrode structure at its first end;

FIG. 3 shows a laser welded point of electrical and physical connection of a current collector plate to a first end of the jelly roll of FIGS. 1 and 2;

FIG. 4 is a plan view of a battery housing showing one arrangement of a plurality of electrode assemblies for a battery in accordance with a first embodiment of the invention;

FIG. 5 is a perspective of the embodiment of FIG. 4;

FIG. 6 is a plan view of a battery can showing another arrangement of a plurality of electrode assemblies for a battery in accordance with a second embodiment of the invention;

FIG. 7 is a perspective of the embodiment of FIG. 6;

FIG. 8 is a plan view of a battery can showing another arrangement of a plurality of electrode assemblies for a battery in accordance with a third embodiment of the invention;

FIG. 9 is a perspective of the embodiment of FIG. 8;

FIG. 10 is a perspective view of an electrode assembly holder for a battery in accordance with a third embodiment of the invention;

FIG. 11 is a perspective view of the battery of FIG. 8 showing one embodiment of the current collector plate in accordance with the invention;

FIG. 12 is a sectional perspective view of the holder for the battery in accordance with the third embodiment showing apertures and channels in walls of the holder for passage of gas and electrolyte solution within the battery can;

FIG. 13 is an enlarged view of a wall of the holder of FIG. 12;

FIG. 14 is a sectional perspective view of the holder for the battery in accordance with the third embodiment showing an alternative arrangement of apertures and channels in walls of the holder for passage of gas and electrolyte solution within the battery can;

FIG. 15 is an enlarged view of a wall of the holder of FIG. 14;

FIGS. 16A, 16B and 16C are respective views of different arrangements of electrode assemblies for the battery in accordance with the third embodiment of the invention;

FIG. 17 is a sectional view of a battery in accordance with the third embodiment of the invention;

FIG. 18 is an enlarged view of a sealing arrangement for the battery of FIG. 17;

FIG. 19 is an enlarged view of a battery in accordance with the third embodiment of the invention showing a different closure arrangement to that shown in FIGS. 17 and 18; and FIG. 20 is a sectional view of a battery in accordance with a fourth embodiment of the invention.

MODE FOR THE INVENTION

Mode for Invention

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Referring to FIG. 1, shown is a perspective view of an electrode assembly 10 for a battery (not shown) in accordance with the invention in the form of a partially wound jelly roll 10. It will be understood that the jelly roll 10 will be fully wound in use. The jelly roll 10 comprises a positive electrode layer or plate (hereinafter referred to as a "layer") 12, a negative electrode layer 14 and one or more separator layers 16. The separator layer 16 is placed intermediate the positive electrode layer 12 and the negative electrode layer 14 to provide electrical insulation there-between. The positive electrode layer 12, the separator layer(s) 16 and the negative electrode layer 14 are initially formed as a sheet-form stack and then wound into the coiled electrode assembly jelly roll 10 depicted in FIG. 1. In this example, the jelly roll 10 is cylindrical having a curved outer side 10S between its first end 10A and its second end 10B. It will be understood, however, that the jelly roll 10 need not be cylindrical, but could be, for example, square or rectangular in shape or other shapes when viewed from above its first end 10A. The jelly roll 10 may therefore be formed by conventional means and have a conventional structure and conventional form. However, for the present invention, it is preferred to make some modifications to the jelly roll 10 as will be better understood from FIG. 2.

In the jelly roll 10 of FIGS. 1 and 2, the positive electrode layer 12, the separator layer 16 and the negative electrode layer 14 are initially formed as a stack such that a peripheral edge portion 12A of the positive electrode layer 12 extends outwardly from the first end 10A of a body 10C of the jelly roll 10 whilst a peripheral edge portion 14A of the negative electrode layer 14 extends outwardly from an opposing, second end 10B of the body 10C of the jelly roll 10. The respective outwardly extending peripheral edge portions 12A, 14A of the positive electrode layer 12 and the negative electrode layer 14 provide the means by which positive and negative electrical contacts or connections can be made with the jelly roll 10.

Referring to FIG. 2, a first preferred modification to the jelly roll 10 is to press or crimp or otherwise deform or substantially flatten at least the extending peripheral edge portion 12A of the positive electrode layer 12 at the first end 10A of the jelly roll 10. Alternatively or additionally, the extending peripheral edge portion 14A of the negative electrode layer 14 at the second end 10B of the jelly roll 10 may be processed in a same or similar manner. The purpose of deforming at least the extending peripheral edge portion 12A of the positive electrode layer 12 is to form a layered electrode structure 18 at said first end 10A.

The extending peripheral edge portion 12A of the positive electrode layer 12 at the first end 10A of the jelly roll 10 comprises a spiral edge portion 12A extending upwardly from the body 10C of the jelly roll 10 and extending as a continuous peripheral edge portion 12A throughout the spiral formation of the jelly roll 10.

However, the peripheral edge portion 12A presents itself, in effect, as a series of substantially concentric edge portions 12A as viewed in FIG. 2 which, when inwardly pressed over or crimped to substantially flatten said edge portions 12A causes said edge portions 12A to overlap to some degree.

In a second preferred modification of the jelly roll 10, the amount by which the spiral peripheral edge portion 12A of the positive electrode layer 12 extends upwardly from the body 10C of the jelly roll 10 is preferably selected to be greater than is typically found in conventional jelly rolls 10. More particularly, the amount of extension is preferably selected to be sufficient such that, when inwardly pressed over or crimped to deform said edge portion 12A, it causes said substantially concentric edge portions 12A to overlap to an extent that they form the continuous layered electrode structure 18 at said first end 10A of the jelly roll 10 as can be seen in FIG. 2 and in more detail in FIG. 3. That is, there are no gaps between the substantially concentric edge portions 12A, i.e. no gaps in the overlapped, layered structure 18 formed over the width of the first end 10A of the jelly roll 10. Furthermore, the amount by which the spiral peripheral edge portion 12A of the positive electrode layer 12 extends from the body 10C of the jelly roll 10 is preferably selected such that the resulting layered structure 18 has at least two layers of thickness at any point over the covered width of the first end 10A of the jelly roll 10.

Referring to FIG. 3, a current collector plate 20 can be connected to the layered electrode structure 18 formed over the width of the first end 10A of the jelly roll 10 at one or more points 22 provisioned by apertures 22A in the current collector plate 20.

It can be seen in FIG. 3 that the inwardly crimped over edge portions 12A of the positive electrode layer 12 are overlapped to the extent that they form the continuous positive electrode structure 18 over the width of the first end 10A of the jelly roll 10 and such that the so formed positive electrode structure 18 is three layers 12A or more deep at some points and always at least two layers 12A deep.

Preferably, the one or more connection points 22 enable welded connections in the form of weld points 23 to be formed where each weld point 23 is preferably formed by laser welding. Laser welding is preferred as it allows close control of welding energy such that it reduces the possibility of the weld point 23 penetrating all the way through the layers 12A of the layered electrode structure 18 to thereby damage the separator layer 16 of the jelly roll 10. Damage to the separation layer is a common problem with resistance welding as is commonly employed in the art. It is preferred that the laser weld 23 is controlled to extend through at least one layer 12A' of the layered structure and into at least one lower layer 12A". This creates both a good electrical connection and a good physical connection between the current collector plate 20 and the positive electrode layer 12 of the jelly roll 10. Preferably, the current collector plate 20 is laser welded to the layered electrode structure 18 at the first end 10A of the jelly roll 10 at a plurality or multiplicity of laser weld points 23. The multiplicity of laser weld points 23 may be arranged to be equally spaced, arranged in a selected pattern, and/or arranged to provide enhanced electrical and physical connection between the current collector plate 20 and the layered electrode structure 18. Consequently, it is preferred that the current collector plate 20 is directly electrically connected to the positive electrode layer 12 of the jelly roll 10. As such, the current collector plate 20 is also directly physically connected to the positive electrode layer 12 of the jelly roll 10.

Preferably, the multiple weld points 23 are arranged to be substantially equally spaced over said first ends 10A of said plurality of jelly rolls 10.

It will be understood that the downwardly extending peripheral edge portion 14A of the negative electrode layer 14 could also be crimped over in a like manner to that of the peripheral edge portion 12A of the positive electrode layer 12 and then pressed against and/or connected by laser welding to a respective battery negative terminal to form at least an electrical pathway between the negative electrode layer 14 and the battery negative terminal.

Referring to FIGS. 4 and 5, shown are a plan view and a perspective view of a battery housing 32 showing one arrangement of a plurality of electrode assemblies 10 for a high capacity battery 30 in accordance with a first embodiment of the invention. The battery assemblies 10 may each comprise a jelly roll 10 in accordance with that described with respect to FIGS. 1 to 3. The plurality of electrode assemblies 10 is preferably arranged substantially in parallel with each other within the single battery housing 32. In this embodiment, the battery housing 32 comprises a battery can 32. The battery can 32 is substantially cylindrical in shape with an upper open end 32A and a lower closed end 32B. At least the closed end 32B of the battery can 32 is preferably formed of an electrically conductive material such that said closed end 32B forms, in use, a negative terminal for the battery 30. A side wall 32S of the can 32 surrounds a battery compartment 33 preferably defining a single shared volume for receiving the plurality of electrode assemblies 10. Preferably, the shared volume 33 of the battery can 32 does not include any internal partitions dividing said volume 33 into separate battery compartments.

Whilst the following description makes reference to a battery can as the battery housing, it will be understood that the present invention is not limited to use of a battery can as afore-described, but that the concepts of the invention could be equally implemented using other battery housing structures.

A current collector plate 20 shown in more detail and by way of example in FIG. 11 is arranged to be directly electrically in contact with the first ends 10A of the plurality of electrode assemblies 10. A second current collector plate (not shown) may be arranged to be directly electrically in contact with the second ends 10B of the plurality of electrode assemblies 10, but in the following description reference will only be made to contact or connection of a current collector plate 20 to the first ends 10A of the electrode assemblies 10 by way of illustrating the concepts of the invention. In the case where a second current collector plate is provided, such plate may be used to connect the second ends 10B of the plurality of electrode assemblies 10 to an electrically conductive end plate 32B comprising the closed end of the battery can 32 to thereby form the negative terminal of the battery 30. The second current collector plate may comprise a metal foam placed between the second ends 10B of the plurality of electrode assemblies 10 and an inner surface of the electrically conductive end plate 32B comprising the closed end of the battery can 32.

In one embodiment, the current collector plate 20 may be directly electrically in contact with the first ends 10A of the plurality of electrode assemblies 10 by pressing said current collector plate 20 directly onto said first ends 10A of the plurality of electrode assemblies 10 and, more particularly, pressing said current collector plate 20 directly onto the layered electrode structure 18 formed at said first ends 10A of the plurality of electrode assemblies 10.

In another more preferred embodiment, the current collector plate 20 is directly electrically connected to the first ends 10B of the plurality of electrode assemblies 10 by laser welding said current collector plate 20 directly onto said first ends 10A of the plurality of electrode assemblies 10 and, more particularly, by laser welding said current collector plate 20 directly by means of one or a multiplicity of laser weld points 23 onto the layered electrode structure 18 formed from the peripheral edge portions 12A of the positive electrode layers 12 at said first ends 10A of the plurality of electrode assemblies 10.

The current collector plate 20 is preferably arranged to fit wholly within the battery can 32 without contacting an inner surface of said battery can 32.

In FIGS. 4 and 5, it can be observed that the plurality of electrode assemblies comprising jelly rolls 10 is arranged within the can 32 such that a region of an outer side 10C of each jelly roll contacts a region of an outer side 10C of at least one other jelly roll 10. In this embodiment, each jelly roll contacts a region of the outer sides 10C of each of the jelly rolls 10 immediately adjacent to it. It is therefore necessary to place an electrically non-conductive barrier 34 between at least each region of contact between the outer sides 10C of the jelly rolls 10. The electrically non-conductive barrier 34 positioned between each region of contact between outer sides 10C of the jelly rolls 10 may be provided by wrapping an outer side 10C of each jelly roll 10 with an electrically non-conductive sheet material. The electrically non-conductive barriers 34 placed between each region of contact between the outer sides 10C of the jelly rolls 10 is preferably formed of a liquid absorbent material. This has the advantage that it assists the movement of electrolyte solution throughout the battery can 32 by a wicking effect. This is particularly advantageous when the battery 30 is placed on its side compared to its upright orientation shown in FIG. 5 where the electrolyte solution would dwell in a lower side part of the battery 30 when placed on its side.

Referring to FIGS. 6 and 7, shown are a plan view and a perspective view of a battery can 132 showing another arrangement of a plurality of electrode assemblies 110 for a high capacity battery 130 in accordance with a second embodiment of the invention. Once again, the battery electrode assemblies 110 may each comprise a jelly roll 110 in accordance with that described with respect to FIGS. 1 to 3. The plurality of electrode assemblies 110 is arranged substantially in parallel with each other within the single battery can 132. A current collector plate (not shown) is arranged to be directly electrically in contact with the first ends of the plurality of electrode assemblies 110.

The current collector plate may be directly electrically in contact or in connection with the first ends of the plurality of electrode assemblies 110 by the same or similar means described with respect to the embodiment of FIGS. 4 and 5.

In FIGS. 6 and 7, it can be observed that the plurality of electrode assemblies comprising jelly rolls 110 is arranged within the can 132 such that outer sides of jelly rolls 110A in contact with an inner wall 132D of the can 132 each surround and make contact with an outer side of a central jelly roll 110C, but do not make contact with each other. It is therefore necessary to place an electrically non-conductive barrier 134 between regions of contact between the outer sides of the surrounding jelly rolls 110A and the central jelly roll 110C. The electrically non-conductive barrier 134 positioned between each region of contact may be provided by wrapping an outer side of only the central jelly roll 110C with an electrically non-conductive sheet material 134. The electrically non-conductive sheet material is preferably formed of a liquid absorbent material such that it assists the movement of electrolyte solution throughout the battery can by a wicking effect or the like.

In the embodiments of FIGS. 4 and 5 and FIGS. 6 and 7, it can be seen that their exist spaces between the jelly rolls 10, 110 within the volume 33 of the battery can 32, 132. One advantage of the spaces is that a greater quantity of electrolyte solution can be added to the can 32, 132 proportionately speaking compared to conventional batteries or battery cells without increasing the level of electrolyte solution within the can 32, 132.

In the embodiments of FIGS. 4 and 5 and FIGS. 6 and 7, it is preferred that the plurality of jelly rolls 10, 110 are sized so at to be able to be placed without interference within the can 32, 132, i.e. without compressing said jelly rolls 10, 110. This is advantageous in that, when electrolyte solution is added to the can 32, 132, the jelly rolls 10, 110 swell. The size of the jelly rolls 10, 110 is preferably selected such that they swell by an amount sufficient to retain said jelly rolls snugly within the can 32, 132 without the need for other means to retain the jelly rolls 10, 110 in position with the can 32, 132. This reduces movement of the jelly rolls 10, 110 within the can 32, 132.

Referring to FIGS. 8 and 9, shown are a plan view and a perspective view of a battery can 232 showing another arrangement of a plurality of electrode assemblies 210 for a high capacity battery 230 in accordance with a third embodiment of the invention. Once again, the battery assemblies 210 may each comprise a jelly roll 210 in accordance with that described with respect to FIGS. 1 to 3. The plurality of electrode assemblies 210 is arranged substantially in parallel with each other within the single battery can 232. A current collector plate (not shown) is arranged to be directly electrically in contact with the first ends of the plurality of electrode assemblies 210.

The current collector plate may be directly electrically in contact or in connection with the first ends of the plurality of electrode assemblies 210 by the same or similar means described with respect to other embodiments.

In FIGS. 8 and 9, it can be observed that the plurality of jelly rolls 210 is arranged within the can 232 by means of one or a plurality of holders 240. Each of said one or a plurality of holders 240 contacts an outer side of at least one jelly roll 210 to position it within the can 232 in a spaced relationship with the other jelly rolls 210. The one or a plurality of holders 240 may comprise holes 242 and/or channels 244 (FIGS. 13 and 15) to facilitate improved gas exchange within the battery can 232 and improved flow of electrolyte solution. The holes 242 and/or channels 244 also enable the amount or volume of electrolyte solution added to the can 232 to be increased above conventional levels, but without raising the level of electrolyte solution in the can 232 above conventional levels.

FIG. 10 is a perspective view of the holder 240 formed as a single piece having an outer wall 240A adapted to conform to an inside surface of the battery can. The holder 240 comprises a plurality of electrode assembly insertion holes 2401 each adapted to receive and position an electrode assembly within the can. The holder 240 may be formed of a liquid absorbent material to promote flow of electrolyte solution between the electrode assemblies in the can.

FIG. 11 shows the single piece holder 240 of FIG. 10 positioned within a battery can 232 with a current collector plate 220 positioned over the plurality of insertion holes 2401. The current collector plate 220 may comprise a plain sheet-form electrically conductive plate. Alternatively, it may be machined as shown in FIG. 11 to provide one or more height adjustable contact members 220H over one or more of the holder insertion holes 2401. The height adjustable contact members 220H always remain physically and electrically connected to a frame 220F of the current collector plate 220, but may be pivotally connected to said frame 220F to afford some height adjustment. The height adjustable contact members 220H enable the current collector plate 220 to be pressed into contact with and/or laser welded to a plurality of jelly roles of slightly different heights, i.e. the height adjustable contact members 220H compensate for differences in height between the jelly rolls.

Preferably, the current collector plate 220 is of a size, i.e. diameter, which enables it to be wholly accommodated within the battery can 232 and, more particularly, within an upper peripheral wall section 240U of the holder 240. The upper peripheral wall section 240U of the holder 240 electrically insulates the current collector plate 220 from the side wall 232A of the can 232.

In addition to, or alternatively to, being formed of a liquid absorbent material, the holder 240 may be provisioned with a plurality of holes 242 and/or channels 244 sized to promote capillary flow of electrolyte solution through said holes 242 and/or channels 244 and to improve gas exchange within the battery can. Referring to FIGS. 12 and 13, it can be seen that internal walls 240W of the holder 240 defining the insertion holes 2401 are formed at least with apertures 242 extending horizontally between said insertion holes 2401. The apertures 242 may be formed in H-shaped circumferential channels 244 which extend in the horizontal plane (as viewed in the drawings) partially or fully around each insertion hole 2401. A plurality of capillary apertures 242 may be formed through each of the walls 240W defining said channels 244.

It will also be observed in FIG. 12 that the height H of the walls 240W of the holder 240 defining the insertion holes 2401 are less than the height h of the jelly rolls 210 received in said insertion holes 2401. This is advantageous in that the walls 240W of the holder 240 defining the insertion holes 2401 do not impede the pressing of the current collector plate 220 onto the tops of the jelly rolls 210 or impede laser welding of said current collector plate to the tops of the jelly rolls 210.

FIGS. 14 and 15 show an alternative arrangement of the apertures 242' and channels 244' for promoting capillary flow of electrolyte solution within the battery can and promoting gas exchange. In this embodiment, the circumferential channels 244' which extend in the horizontal plane partially or fully around each insertion hole 2401 have a greater depth than the channels 244 of the embodiment of FIGS. 12 and 13.

An advantage of providing a holder 240 with insertion holes adapted to position electrode assemblies 210 within the battery is illustrated by FIGS. 16A-C. FIG. 16A shows all of the insertion holes accommodating respective electrode assemblies 210. This represents the highest capacity battery arrangement using the holder 240. In contrast, in FIG. 16B, it can be seen that the central insertion hole 2401 is left vacant thus providing for some degree of flexibility in the capacity of a battery utilizing such a holder 240. Thus, the resulting battery would have a reduced capacity compared to one where all of the insertion holes accommodate respective electrode assemblies 210. FIG. 16C shows yet another arrangement where only three of seven insertion holes 2401 are utilized to position electrode assemblies 210 within the holder 240. It can be seen therefore that the same battery structure can be used to provide various arrangements of different capacity batteries without modifying any of the components comprising the battery. The only variation is the number of electrode assemblies 210 placed into the insertion holes 2401 of the holder 240, but even the electrode assemblies 210 do not require any modification.

In the foregoing and other embodiments, the capacity of the resulting battery may be varied by using different types of electrode assemblies having different amounts of active material. Thus, the combination of the holder 240 and jelly rolls having different amounts of active materials enables a wide range of capacities of batteries to be manufactured from a set of components.

FIG. 17 is a sectional view of a battery 230 in accordance with the third embodiment of the invention. An upper peripheral wall section 240U of the single piece holder 240 is adapted to engage with a terminal 250 of the battery 230. The upper peripheral wall section 240U of the single piece holder 240 is internally screw-threaded to enable an externally threaded part of the battery terminal 250 to be screw-threadedly engaged therewith. When the battery terminal 250 is screw-threadedly engaged with the upper peripheral wall section 240U of the holder 240, the battery terminal 250 may press on or at least hold the current collector plate 220 in direct electrical contact with the first ends 210A of the plurality of electrode assemblies 210. The battery terminal 250 can be screw-threadedly engaged with the upper peripheral wall section 240U of the single piece holder 240 by a selected loading amount. The upper peripheral wall section 240U of the holder 240 electrically insulates the battery terminal 250 from the can 232, It is preferred that the current collector plate 220 is laser welded to the first ends of said electrode assemblies 210 in the manner hereinbefore described. As already indicated, the height of the walls 240W of the holder 210 at their regions of contact with outer sides of the electrode assemblies 210 is smaller than the height of the electrode assemblies 210.

The battery arrangement illustrated by FIG. 17 and further illustrated in enlarged view by FIG. 18 enables batteries in accordance with the embodiments of the invention to be provided with a double seal system. A first seal 260 preferably in the form of an 'O' ring seal 260 is positioned between a peripheral chamfered edge of the battery terminal 250, the upper peripheral wall 240U of the holder 240 and an inside surface 232D of the can 232. The screw-threaded engagement of the battery terminal 250 with the upper peripheral wall section 240U of the holder 240 holds the first seal 260 in position under the selected loading of the battery terminal. The first seal 260 electrically insulates the chamfered part of the battery terminal 250 from the battery can 232. The first seal 260 represents a high pressure seal for the battery 230. A second seal 262 in the form of an annular seal is provided covering a peripheral edge portion of an upper surface of the battery terminal 250 and extending inwardly from and preferably in contact with the inside surface 232D of the can 232. The annular seal 262 may be held in place by crimping an upper edge of the battery can 232 over said second seal 262 as shown in FIG. 19, but is preferably held in place by an annular ring member 264 having an L-shaped cross-section which is fixed at its shorter side to an upper edge of the battery can 232. The L-shaped ring member 264 is preferably laser welded to said upper edge of the battery can 232, but could instead be tungsten inert gas (TIG) welded. The second seal 262 represents a low pressure seal for the battery. The combination of the first and second seals 260, 262 greatly reduces the leakage of gas or electrolyte solution from the battery can 232. The first and second seals 260, 262 also electrically insulate the battery terminal 250 from the battery can 232 as does the holder 240.

FIG. 20 is a sectional view of a battery 330 in accordance with a fourth embodiment of the invention. This embodiment differs from the third embodiment mainly in the fact that the current collector plate is integrally formed with the battery terminal 350, i.e. the current collector plate is not a stand-alone component. Although not apparent from FIG. 20, the battery terminal 350 may screw-threadedly engaged with the holder 240. The battery terminal 350 is electrically insulated from the battery can 352 by a seal 360 surrounding an outer edge of the battery terminal 350. A battery cap plate 370 may be fixed to an upper edge portion of the battery can 352 by welding or the like. Preferably, the battery cap plate 370 is electrically non-conductive, but in any event, the battery terminal may also be electrically insulated from the battery cap plate 370 by the seal 360. A part 350A of the battery terminal 350 protrudes through an aperture in the battery cap plate to enable an external electrical connection to be made with the battery terminal 350. The part 350A of the battery terminal 350 is also preferably formed integrally with the body of the battery terminal 350.

All of the means described herein to promote flow or movement of electrolyte solution through the battery chamber have at least the advantages of promoting the even distribution of electrolyte to the plurality of electrode assembles, improving and evening out thermal conduction in the battery chamber, and preventing any of the plurality of electrode assembles drying out.

The embodiments of the battery in accordance with the invention are particularly suited, although not exclusive to, Nickle-based batteries such as NiMH batteries and NiZn batteries.

In the foregoing embodiments, it can be seen that the plurality of electrode assemblies share a same, single electro-chemical system within the batteries.

The invention also provides electrode modules for battery embodiments as hereinbefore described and methods of assembling such batteries.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A battery comprising:
    a housing arranged to accommodate an electrolyte solution;
    a battery terminal;
    an electrode assembly holder having a peripheral wall conforming to an inside surface of the housing;
    one or more jelly roll electrode assemblies positioned in the housing by means of the holder, wherein the holder is configured with one or more channels to allow fluid communication of the electrolyte solution among the one or more jelly roll electrode assemblies; and
    an upper peripheral wall section of the holder is adapted to engage the battery terminal to facilitate a direct physical and electrical contact of the one or more jelly roll electrode assemblies with the battery terminal,
    wherein a height of walls defining a plurality of insertion holes at the upper peripheral wall section of the holder is substantially less than a height of the one or more jelly roll electrode assemblies being received in said insertion holes.

2. The battery of claim 1, wherein the upper peripheral wall section of the holder is screw-threaded to enable the battery terminal having a corresponding threaded part to be screw-threadedly engaged therewith.

3. The battery of claim 1, further comprising a first seal positioned between the battery terminal, the upper peripheral wall of the holder and an inside surface of the housing.

4. The battery of claim 3, wherein, when the upper peripheral wall section of the holder is screw-threadedly engaged with the threaded part of the battery terminal, the first seal is arranged to be compressed between the battery terminal, the upper peripheral wall of the holder and the inside surface of the housing to thereby secure the screw-threaded engagement between the holder and the battery terminal.

5. The battery of claim 3, wherein the first seal is positioned such that it is compressed by an inwardly inclined, side surface of the battery terminal, the upper peripheral wall of the holder and the inside surface of the housing when the holder is screw-threadedly engaged with the battery terminal.

6. The battery of claim 3, wherein the first seal, the battery terminal, and the upper peripheral wall section of the holder cooperatively define a high pressure zone for accommodating leakage of gas or electrolyte solution from the battery.

7. The battery of claim 6, further comprising a second seal covering a peripheral edge portion of an upper surface of the battery terminal and extending inwardly from the inside surface of the housing.

8. The battery of claim 7, wherein the first seal, the second seal, the battery terminal and the inside surface of the housing cooperatively define a lower pressure zone for accommodating leakage of gas or electrolyte solution from the high pressure zone.

9. The battery of claim 1, wherein the battery terminal comprises a current collector plate configured to be in direct physical and electrical contact with the one or more jelly roll electrode assemblies.

10. The battery of claim 9, wherein the current collector plate is integrally formed with the battery terminal.

11. The battery of claim 1, wherein the battery is a Nickle based rechargeable battery.

12. The battery of claim 1, wherein the one or more jelly roll electrode assemblies share a same, single electro chemical system.

* * * * *